United States Patent
Inoue

(10) Patent No.: US 6,644,108 B2
(45) Date of Patent: Nov. 11, 2003

(54) PNEUMATIC TIRE PRESSURE ESTIMATING APPARATUS

(75) Inventor: Yuichi Inoue, Tajimi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/146,798

(22) Filed: May 17, 2002

(65) Prior Publication Data

US 2002/0178823 A1 Dec. 5, 2002

(30) Foreign Application Priority Data

May 18, 2001 (JP) ........................ 2001-149706

(51) Int. Cl.[7] ................ E01C 23/00; G01H 17/02; B60C 23/02
(52) U.S. Cl. .................. 73/146; 73/146.5; 340/443; 340/442
(58) Field of Search ................ 73/146–146.8; 116/34; 701/47; 702/17, 75, 190, 140, 148, 143; 340/443, 442, 444; 200/61.23, 61.22

(56) References Cited

U.S. PATENT DOCUMENTS

| | | | | |
|---|---|---|---|---|
| 4,210,898 A | * | 7/1980 | Betts | 340/443 |
| 4,574,267 A | | 3/1986 | Jones | |
| 5,252,946 A | * | 10/1993 | Walker et al. | 340/444 |
| 5,541,859 A | * | 7/1996 | Inoue et al. | 702/148 |
| 5,553,491 A | * | 9/1996 | Naito et al. | 73/146.5 |
| 5,753,809 A | | 5/1998 | Ogusu et al. | |

FOREIGN PATENT DOCUMENTS

| | | |
|---|---|---|
| EP | 0756951 A1 | 2/1997 |
| EP | 0925960 A2 | 6/1999 |
| JP | 5-294121 | 11/1993 |
| JP | 7-109949 | 4/1995 |
| JP | 9-104208 | 4/1997 |
| JP | 10-217724 | 8/1998 |

\* cited by examiner

Primary Examiner—Andrew H. Hirshfeld
Assistant Examiner—Marissa L Ferguson
(74) Attorney, Agent, or Firm—Posz & Bethards, PLC

(57) ABSTRACT

Lowpass and highpass filters, having cutoff frequencies different from each other, are used to perform first to fourth filter processing. Then, product-sums of outputs of respective filter processing are obtained. Then, frequencies corresponding to the resonance frequency are obtained based on the result of respective product-sum calculations. The thus obtained frequencies are different from each other in the degree of influence of noise components. Then, among the obtained frequencies, an optimum frequency having less influence of noise components is selected. Then, the selected frequency is smoothed to obtain a resonance frequency for a pneumatic tire pressure estimation.

19 Claims, 9 Drawing Sheets

PNEUMATIC TIRE PRESSURE ESTIMATING APPARATUS

BACKGROUND OF THE INVENTION

The present invention relates to an apparatus for estimating a pneumatic tire pressure. Especially, the present invention is preferably applicable to the system which indirectly estimates the pneumatic pressure of a tire based on a wheel speed.

As a conventional technique, for example, the unexamined Japanese patent publication No. 9-104208 corresponding to the U.S. Pat. No. 5,753,809 discloses a pneumatic tire pressure estimating apparatus which detects a resonance frequency from vibrational information of a tire and obtains a pneumatic tire pressure based on the detected resonance frequency. According to this conventional apparatus, to enable the pneumatic tire pressure detection in a limited microcomputer resource, the resonance frequency is simply obtained by using model approximation or by using linear prediction of time series vibrational information. The pneumatic tire pressure is estimated based on the thus simply obtained resonance frequency.

However, the above-described conventional technique basically relies on approximation in detecting the resonance point. This is disadvantageous in such a case that the information other than the objective resonance frequency is contained in the vibrational information. The frequency to be detected tends to be drawn toward peripheral noise components. The resonance frequency cannot be detected correctly. This will increase dispersion in the detection of resonance point.

On the other hand, to remove the influence of peripheral noise components, it will be possible to use filters having high damping properties or filters having narrow bands. However, if required to enhance the damping property, the order of filters will be necessarily increased up to several tens. It will require a limited high-performance microcomputer or a DSP. The cost of system will increase. Accordingly, the practical order of filters is limited to two to four.

Meanwhile, there is a conventional method for securing a required damping property by using narrow-band filters while the order of filters remains the same. However, when the resonance frequency disagrees with the central frequency of the filters, the resonance information itself will be distorted due to the influence of the filters. Hence, it will be difficult to accurately detect the resonance frequency.

SUMMARY OF THE INVENTION

In view of the above-described problems of the prior art, the present invention has an object to accurately detect the frequency information considering the influence of noise components.

To accomplish the above and other related objects, the present invention provides a first estimating apparatus for estimating a pneumatic tire pressure comprising vibrational information detecting means (1) for detecting vibrational information of a tire, filtering means (S102~S105, S202~S204) for filtering desired frequency information based on the vibrational information detected by the tire vibrational information detecting means, resonance frequency detecting means (S106~S112, S205~S211) for detecting a resonance frequency based on the frequency information filtered by the filtering means, and pneumatic tire pressure estimating means (3) for estimating a pneumatic tire pressure based on the resonance frequency. The filtering means of the first estimating apparatus is constituted by a plurality of filters having filtering effects different from each other. And, the resonance frequency detecting means of the first estimating apparatus comprises means (S106~S110, S205~S209) for obtaining frequencies (f1~f4) corresponding to the resonance frequency based on respective frequency information passing through the plurality of filters, and determining means (S111, S210) for determining an optimum frequency having less influence of noise based on the obtained frequencies, thereby obtaining the resonance frequency based on the optimum frequency determined by the determining means.

In the description of summary of the invention, the reference numerals in parentheses attached to the described means show the correspondence to practical components or steps explained in later-described practical embodiments.

With this arrangement, the frequencies corresponding to the resonance frequency are obtained from the frequency information passing through a plurality of filters. Thus, it becomes possible to obtain frequencies having different influences of noise components. Hence, it becomes possible to detect accurate frequency information having less influence of noise based on the thus obtained frequencies having different influences of noise components.

According to the first estimating apparatus of the present invention, it is preferable, when a dispersion width of the obtained frequencies (f2~f4) is within a predetermined value, the determining means (S111) identifies a central value (f4) among the obtained frequencies as the optimum frequency having less influence of noise. Furthermore, it is preferable, when a dispersion width of the obtained frequencies (f2~f4) is within a predetermined value, the determining means identifies an average value of the obtained frequencies as the optimum frequency having less influence of noise.

On the other hand, it is preferable that the determining means (S210) corrects the obtained frequencies (f1~f3) and identifies a corrected value as the optimum frequency having less influence of noise. For example, it is preferable that the determining means performs the correction based on a deviation of the obtained frequencies.

Furthermore, it is preferable that the determining means performs the correction only when the dispersion width of the obtained frequencies is within a predetermined value.

Furthermore, to change the degree of influence of noise components, it is preferable that the plurality of filters have different bandwidths or damping properties. It is preferable that the plurality of filters have different passbands.

For example, it is preferable that the plurality of filters comprise a first filter passing a first resonance frequency band including a desired frequency component, a second filter passing a second resonance frequency band narrower than the first resonance frequency band, and a third filter passing a third resonance frequency band narrower than the second resonance frequency band.

In this case, it is preferable that the first filter for setting the first resonance frequency band is constituted by a first lowpass filter for filtering a frequency region higher than the first resonance frequency band and a first highpass filter for filtering a frequency region lower than the first resonance frequency band. The second filter for setting the second resonance frequency band is constituted by the first lowpass filter and a second highpass filter having a cutoff frequency higher than that of the first highpass filter. And, the third filter for setting the third resonance frequency band is constituted by the second highpass filter and a second lowpass filter having a cutoff frequency lower than that of the first lowpass filter.

Furthermore, it is preferable that the frequencies (f1~f4) corresponding to the resonance frequency can be obtained based on calculation result of the means (S106~S108, S205~S207) for calculating a product-sum of respective frequency information passing through the first to third resonance frequency bands.

The present invention provides a second estimating apparatus for estimating a pneumatic tire pressure comprising tire vibrational information detecting means (1) for detecting vibrational information of a tire, filtering means (S102~S105, S202~S204) for filtering desired frequency information based on the vibrational information detected by the tire vibrational information detecting means, resonance frequency detecting means (S106~S112, S205~S211) for detecting a resonance frequency based on the frequency information filtered by the filtering means, and pneumatic tire pressure estimating means (3) for estimating a pneumatic tire pressure based on the resonance frequency. The filtering means of the second estimating apparatus is constituted by a plurality of filters having filtering effects different from each other. The resonance frequency detecting means of the second estimating apparatus comprises means (S305~S307) for obtaining gains (G1~G3) based on respective frequency information passing through the plurality of filters, and determining means (S311) for determining an optimum frequency having less influence of noise based on the obtained gains, thereby obtaining the resonance frequency based on the optimum frequency determined by the determining means.

The gains obtained from the frequency information passing through the plurality of filters are different from each other depending on the degree of influence of noise components. Hence, it becomes possible to detect accurate frequency information having less influence of noise based on the thus obtained gains having different influences of noise components.

For example, it is preferable that the resonance frequency detecting means comprises the means (S308~S310) for obtaining frequencies based on respective frequency information passing through the plurality of filters, and the determining means (S311) corrects the obtained frequencies (f1~f3) based on the gains to determine the optimum frequency having less influence of noise. For example, it is preferable that the determining means performs the correction based on a ratio of the gains.

It is also preferable that the determining means performs the correction only when a ratio of the gains is within a predetermined range.

It is also preferable that the plurality of filters have different passbands.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF PREFERRED EMBODIMENTS

Preferred embodiments of the present invention will be explained hereinafter with reference to attached drawings.

First Embodiment

Figure 1:
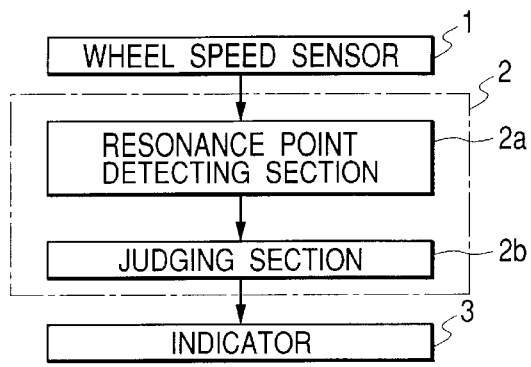
FIG. 1 is a view showing a schematic block diagram showing a pneumatic tire pressure estimating apparatus in accordance with a first embodiment of the present invention.

FIG. 1 is a view showing a schematic block diagram showing a pneumatic tire pressure estimating apparatus in accordance with a first embodiment of the present invention. The pneumatic tire pressure estimating apparatus of the first embodiment detects a resonance frequency of each wheel speed and judges based on the detected resonance frequency as to whether or not an actual pneumatic tire pressure is lower than a lower limit.

The resonance point of vibration of a vehicle unsprung member is generally referred to as unsprung resonance frequency. The unsprung resonance frequency decreases with decreasing pneumatic tire pressure. Meanwhile, the vibration of the vehicle unsprung member gives influence to rotational movement of a wheel. As a result, the vibration of the vehicle unsprung member causes a resonance frequency of a wheel speed signal representing the rotational speed of a wheel. The resonance frequency obtained from the wheel speed is similar to the unsprung resonance frequency. In other words, the resonance frequency obtained from the wheel speed decreases with decreasing pneumatic tire pressure.

The pneumatic tire pressure estimating apparatus of this invention estimates the pneumatic tire pressure based on the above-described relationship and judges whether or not the estimated pneumatic tire pressure is lower than a lower limit value.

As shown in FIG. 1, the pneumatic tire pressure estimating apparatus comprises a wheel speed sensor 1 serving as tire vibrational information detecting means, a signal processing section 2 for processing a sensing signal of the wheel speed sensor 1 and executing the above-described judgement with respect to the pneumatic tire pressure, and an indicator 3 for indicating judgement result of the signal processing section 2 according to a predetermined pattern.

The wheel speed sensor 1 obtains vibrational information of each tire to detect a rotational speed of each wheel of a vehicle. The wheel speed sensor 1 is equipped to each of right and left front wheels (FL wheel and FR wheel) and to each of right and left rear wheels (RL wheel and RR wheel). The wheel speed sensor 1 is an electromagnetic pickup type or any other conventional sensor.

The signal processing section 2 is constituted by a microcomputer having CPU, ROM and RAM, in which ROM is chiefly used as program memory and RAM is used as data memory. The signal processing section 2 is separated into a resonance point detecting section 2a and a judging section 2b. The functions of resonance point detecting section 2a and judging section 2b can be realized by utilizing the processing function of the microcomputer.

The resonance point detecting section 2a estimates a resonance frequency based on the wheel speed signal sent from the wheel speed sensor 1. More specifically, the resonance point detecting section 2a obtains resonance frequency components from the wheel speed signal and detects frequencies corresponding to the resonance frequency. Furthermore, the resonance point detecting section 2a obtains the degree of influence of noise components with respect to the detected frequency. The resonance point detecting section 2a selects the resonance frequency to be used for the pneumatic tire pressure estimation among the detected frequencies based on the degree of influence of noise components. And, the resonance point detecting section 2a performs the pneumatic tire pressure estimation based on the selected resonance frequency.

The judging section 2b compares the pneumatic tire pressure estimated by the resonance point detecting section 2a with a predetermined threshold to judge the presence of pneumatic tire pressure reduction of a corresponding wheel. When the estimated pneumatic tire pressure is lower than the threshold value, the judging section 2b sends a pneumatic pressure reduction signal to the indicator 3. The pneumatic pressure reduction signal indicates the reduction of pneumatic tire pressure.

The indicator 3 is, for example, constituted by warning lamps corresponding to respective wheels. When any pneumatic tire pressure reduction is detected based on judgement of the judging section 2b, the indicator 3 turns on a warning lamp corresponding to the wheel having caused the pneumatic tire pressure reduction, thereby notifying the pneumatic tire pressure reduction of each wheel.

Figure 2:
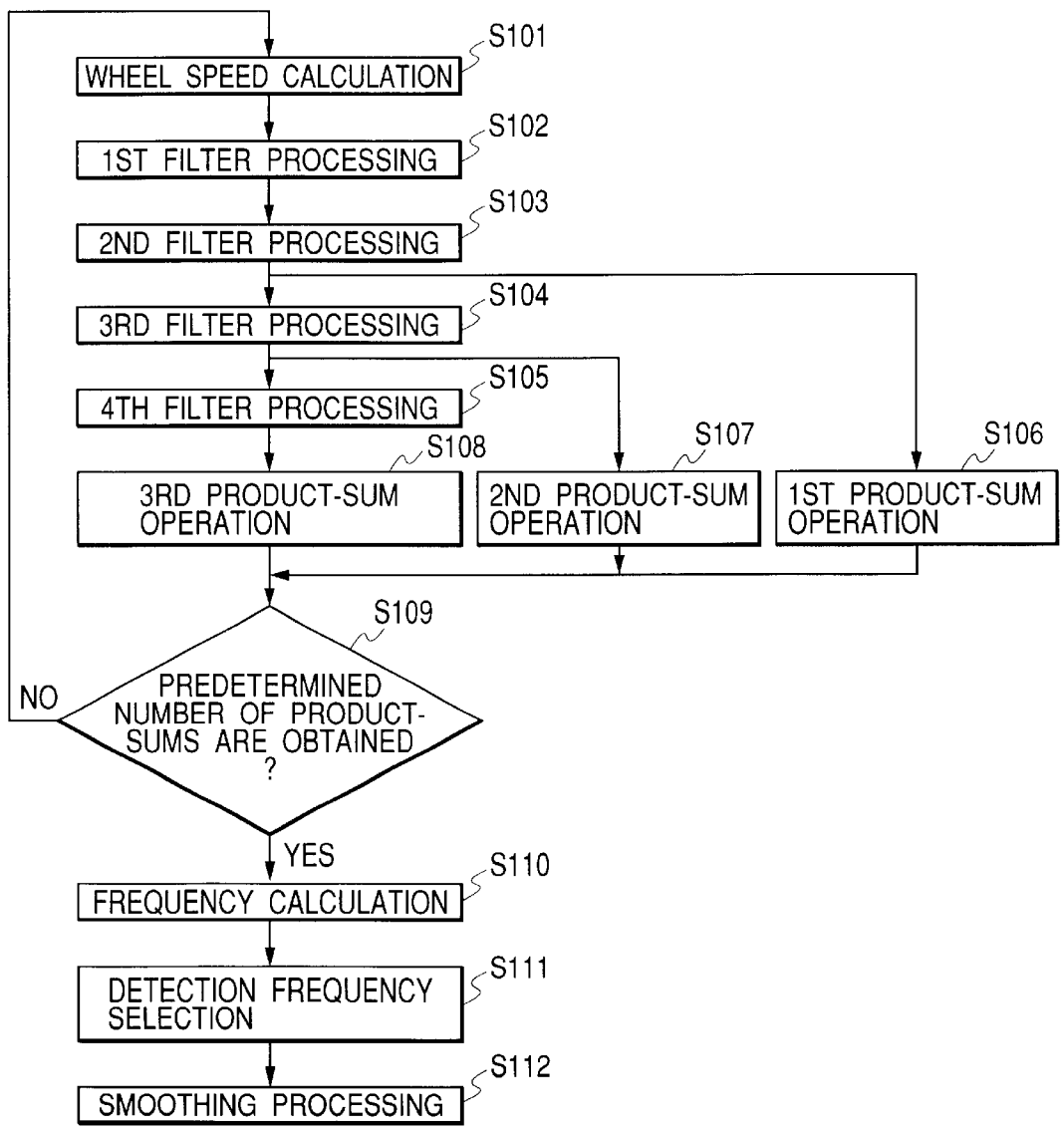
FIG. 2 is a flowchart showing the processing performed in a resonance point detecting section of the pneumatic tire pressure estimating apparatus in accordance with the first embodiment of the present invention.

FIG. 2 is a flowchart showing the processing performed in the resonance point detecting section 2a in the signal processing section 2. The pneumatic tire pressure estimation of this embodiment will be explained in detail with reference to the flowchart of FIG. 2.

The resonance point detecting section 2a performs the following processing in response to entry of the wheel speed signal sent from the wheel speed sensor 1. First, in step S101, the resonance point detecting section 2a calculates a wheel speed $f_{in}$ based on the wheel speed signal. For example, the wheel speed sensor 1 outputs an alternating-current signal. The resonance point detecting section 2a converts this alternating-current signal into a binary pulse signal through waveform shaping. Then, the resonance point detecting section 2a calculates an average value of the pulse width at predetermined sampling periods. Then, the resonance point detecting section 2a obtains the wheel speed $f_{in}$ based on a reciprocal of the calculated average value.

Subsequently, the filter processing is successively performed based on the calculated wheel speed in each of steps S102, S103, S104, and S105 to detect desired frequency information. First, in step S102, first filter processing is applied to the wheel speed $f_{in}$. More specifically, the resonance point detecting section 2a executes calculation defined by the following equation. Through this calculation processing, an output $f_{out}$ of a lowpass filter having a cutoff frequency of 60 Hz is obtained. This output is referred to as $f_{out1}$. In the following equation, $a_{11}$, $a_{21}$, $b_{01}$, $b_{11}$, and $b_{21}$ are arbitrary constants which are filter coefficients determined depending on the order of filters and the sampling intervals. Furthermore, 'k' represents the sampling number, while 'k–1' and 'k–2' correspond the input/output of one and two sampling cycles before.

$$f_{out}=b_{01} \times f_{in}(k)+b_{11} \times f_{in}(k-1)+b_{21} \times f_{in}(k-2)+a_{11} \times f_{out}(k-1)+a_{21}f_{out}(k-2) \quad (1)$$

Next, in step S103, the calculation result $f_{out1}$ obtained in step S102 is regarded as $f_{in}$ of the above-described equation 1. Then, the thus obtained $f_{in}$ is subjected to second filter processing using the above-described equation 1, although respective constants $a_{11}$, $a_{21}$, $b_{01}$, $b_{11}$, and $b_{21}$ are different from those used in step S102. Through this calculation processing, an output $f_{out}$ of a highpass filter having a cutoff frequency of 20 Hz is obtained. This output is referred to as $f_{out2}$.

Next, in step S104, the calculation result $f_{out2}$ obtained in step S103 is regarded as $f_{in}$ of the above-described equation 1. Then, the thus obtained $f_{in}$ is subjected to third filter processing using the above-described equation 1, although respective constants $a_{11}$, $a_{21}$, $b_{01}$, $b_{11}$, and $b_{21}$ are different from those used in steps S102 and S103. Through this calculation processing, an output $f_{out}$ of a highpass filter having a cutoff frequency of 25 Hz is obtained. This output is referred to as $f_{out3}$. In other words, the passband of the third filter processing in step S104 is narrower than the passband of the second filter processing in step S103.

Next, in step S105, the calculation result $f_{out3}$ obtained in step S104 is regarded as $f_{in}$ of the above-described equation 1. Then, the thus obtained $f_{in}$ is subjected to fourth filter processing using the above-described equation 1, although respective constants $a_{11}$, $a_{21}$, $b_{01}$, $b_{11}$, and $b_{21}$ are different from those used in steps S102, S103, and S104. Through this calculation processing, an output $f_{out}$ of a lowpass filter having a cutoff frequency of 55 Hz is obtained. This output is referred to as $f_{out4}$. In other words, the passband of the fourth filter processing in step S104 is narrower than the passband of the first filter processing in step S102. In this manner, the filter processing of this embodiment is performed by using a plurality of filters having different filtering effects. The above-described filter processing is executed in the microcomputer. In this respect, the microcomputer serves as filtering means of the present invention.

On the other hand, in steps S106 to S110, the resonance point detecting section 2a obtains the resonance frequencies derived from the frequency information obtained as described above. The resonance frequency is derived in the following manner.

Road disturbance, serving as white noise input, is added to a tire-suspension system. Hence, the wheel speed signal includes road disturbance components. At the same time, the wheel speed signal includes a resonance component which is dependent on a pneumatic tire pressure. The pneumatic tire pressure estimating apparatus uses a linear predictive model to simulate the tire-suspension system and identifies the parameters of this model by using a least squares method. Each wheel has a single resonance point depending on its pneumatic tire pressure. Considering this fact, the required order number for this linear predictive model is 2 at maximum. Using the reduced order number in this manner makes it possible to substantially reduce the volume of computation and memory capacity required for the signal processing apparatus.

The following equation is a secondary discrete time model, wherein 'k' represents the sampling number, m(k) represents the road disturbance, and four represents the wheel speed signals $f_{out2}$ to $f_{out4}$ obtained through the above-described filter processing.

$$f_{out}(k) = c1 \times f_{out}(k-1) + c2 \times f_{out}(k-2) + m(k) \quad (2)$$

The constants c1 and c2 shown in the equation 2 are identified based on finite observation data. The identification of constants c1 and c2 is performed by using a least squares method. Namely, the following equations 3 and 4 are introduced to define secondary vectors, wherein θ is a parameter vector and 'z' is a measurement vector.

$$\theta = \begin{pmatrix} -c1 \\ -c2 \end{pmatrix} \quad (3)$$

$$Z(k) = \begin{pmatrix} fout(k-1) \\ fout(k-2) \end{pmatrix} \quad (4)$$

The above-described equation 2 can be rewritten into the following equation 5 based on the above-described equations 3 and 4.

$$f_{out}(k) = zT(k)\theta + m(k) \quad (5)$$

In the equation 5, m(k) is the road disturbance which can be regarded as white noise. The estimation of unknown parameters according to the least squares is accomplished by obtaining the value of equation 3 which minimizes the evaluation function expressed by the following equation 6. According to a batch least squares method, the estimated value which minimizes the evaluation function of equation 6 is expressed by the following equation 7 (refer to "Introduction to Robust Adaptive Control" written by Kimio Kanai, published by Ohmsha Ltd.).

$$J = \sum_{k=1}^{N} m^2(k) \quad (6)$$

$$\theta = \left[\sum_{k=1}^{N} Z^T(k)Z(k)\right]^{-1} \sum_{k=1}^{N} Z(k)fout \quad (7)$$

Then, the resonance frequency ω is obtained from the thus identified parameters c1 and c2. The following equations 8 and 9 represent the relationship among the secondary discrete time model parameters c1 and c2, the resonance frequency ω, and damping coefficient ζ when 'T' represents a sampling period.

$$c1 = -2e^{-\zeta\omega T}\cos\{\omega\sqrt{1-\zeta^2}T\} \quad (8)$$

$$c2 = e^{-2\zeta\omega T} \quad (9)$$

Accordingly, the resonance frequency ω is expressed by the following equation 10.

$$\omega = \frac{1}{T}\sqrt{\left(\frac{\log c2}{2}\right)^2 + \left\{\cos^{-1}\left(-\frac{c1}{2\sqrt{c2}}\right)\right\}^2} \quad (10)$$

Then, from the relationship f=ω/2π established between the resonance frequency f(Hz) and the resonance frequency ω, the resonance frequency can be calculated. Based on the above-described principle, the resonance frequency f(Hz) can be derived. The thus derived resonance frequency agrees with an area centroid of the frequency distribution with respect to the input vibrational information from the reason that the linear prediction method is used for frequency conversion.

On the other hand, as described above, the wheel speed signal sent from the wheel speed sensor 1 includes the noise components as well as the resonance frequency component to be used for pneumatic tire pressure estimation. Hence, to reduce the influence of noise components, the effective frequency band is detected. The effective frequency band is presumed to contain the resonance frequency component and is detectable by using the filter or the like. Hereinafter, the effective frequency band is referred to as resonance frequency band.

In this case, the degree of influence of noise components varies depending on the way of setting the resonance frequency band. Hence, it becomes possible to obtain the outputs having different influences of the noise components by performing various filter processing using different cutoff frequencies.

Accordingly, first of all, the resonance frequency band is set to be relatively wide. Hereinafter, the initial resonance frequency band being set to be relatively wide is referred to as first resonance frequency band. Then, the filter operation is performed (in steps S102 and S103) by using the filter having a cutoff frequency capable of removing the frequencies higher than the first resonance frequency band (i.e., lowpass filter) or by using the filter having a cutoff frequency capable of removing the frequencies lower than the first resonance frequency band (i.e., highpass filter).

Through this filter operation, the wheel speed signal becomes small in the frequency region lower than the first resonance frequency band as well as in the frequency region higher than the first resonance frequency band. The wheel speed signal is obtained in the first resonance frequency band which is widely set in this manner. As the first resonance frequency band is set widely, the obtained wheel speed signal is a signal including the influence of noise components reflecting the wideness of the first resonance frequency band.

Next, to narrow the lower frequency side of the first resonance frequency band, the next filter operation is performed by using a highpass filter having a cutoff frequency higher than the above-described highpass filter (step S104). Through this filter operation, the wheel speed signal is obtained in a second resonance frequency band. The second resonance frequency band is narrower than the first resonance frequency band in its lower frequency side. Therefore, it becomes possible to obtain the wheel speed signal including the influence of noise components corresponding to the second resonance frequency band.

Next, to narrow the higher frequency side of the second resonance frequency band, the next filter operation is performed by using a lowpass filter having a cutoff frequency lower than the above-described lowpass filter (step S105).

Through this filter operation, the wheel speed signal is obtained in a third resonance frequency band. The third resonance frequency band is narrower than the second resonance frequency band in its higher frequency side. Therefore, it becomes possible to obtain the wheel speed signal including the influence of noise components corresponding to the third resonance frequency band.

Accordingly, based on the principle of deriving above-described resonance frequency f(Hz), three kinds of resonance frequencies f(Hz) are obtained respectively in the first to third resonance frequency bands. Then, an optimum resonance frequency having less influence of peripheral noise can be estimated by comparing the thus obtained resonance frequencies.

Hence, in steps S106 to S108, the resonance point detecting section 2a calculates first to third product-sums. The calculated result is used for obtaining the relationship of equation 7 to derive the resonance frequency f(Hz). More specifically, in step S106, the first product-sum is calculated based on the output $f_{out2}$ of step S103 by using the secondary discrete time model. In step S107, the second product-sum is calculated based on the output fu of step S104 by using the secondary discrete time model. In step S108, the third product-sum is calculated based on the output $f_{out4}$ of step S105 by using the secondary discrete time model. Namely, the relationship of above-described equation 7 is obtained based on the outputs $f_{out2}$ to $f_{out4}$. The output $f_{out1}$ is not used in the calculation of product-sum because no filter processing is applied to the lower frequency side.

Then, in step S109, it is checked whether or not a predetermined number of product-sums are obtained. If the judgement is NO in step S109, the control flow returns to step S101 to repeat the above-described processing. In this case, the predetermined number is, for example, equivalent to the number of calculations within several seconds to several tens seconds.

In step S110, the resonance point detecting section 2a obtains the frequency f2 corresponding to the resonance frequency based on the first product-sum obtained in step S106, the frequency f3 corresponding to the resonance frequency based on the second product-sum obtained in step S107, and the frequency f4 corresponding to the resonance frequency based on the third product-sum obtained in step S108.

The calculation for obtaining the frequency corresponding to the resonance frequency is executed in the microcomputer. In this respect, the microcomputer serves as resonance frequency detecting means of the present invention.

Subsequently, in step S111, the resonance point detecting section 2a compares the thus obtained frequencies f2 to f4 and estimates the optimum resonance frequency having less influence of peripheral noise. Then, the resonance point detecting section 2a selects the estimated optimum resonance frequency. The method for selecting the resonance frequency will be explained with reference to FIG. 3.

Figure 3A:
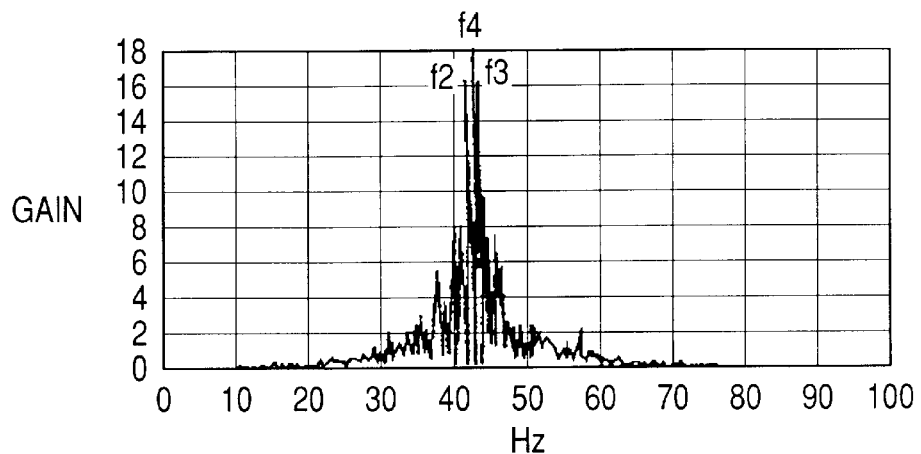
FIGS. 3A, 3B and 3C are graphs each showing respective frequencies f2~f4 obtained with respect to the wheel speed output at a time the second filter processing is accomplished.
Figure 3B:
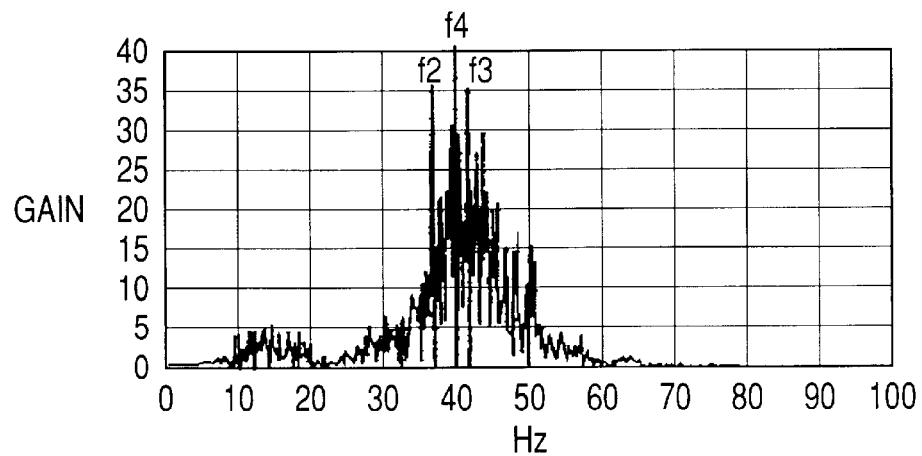
Figure 3C:
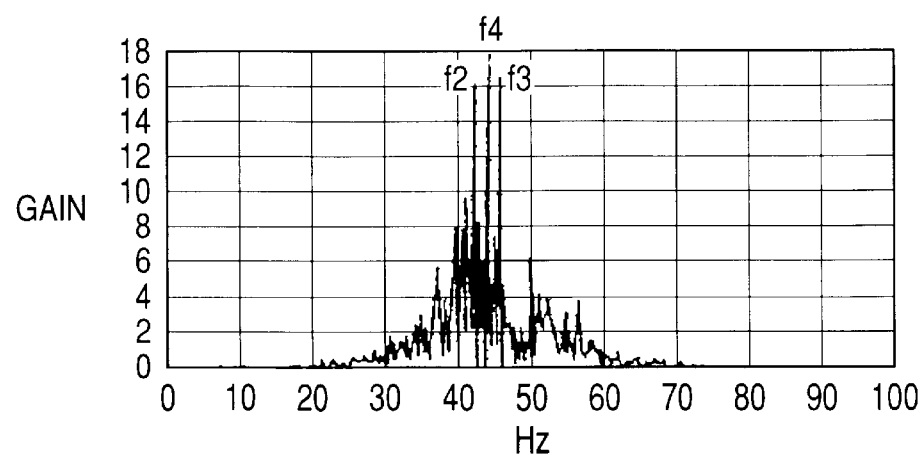

FIGS. 3A, 3B and 3C are graphs each showing respective frequencies f2~f4 obtained with respect to the wheel speed output at a time the second filter processing is accomplished. FIG. 3A shows a case where the noise components are sufficiently removed at each of the lower frequency side and the higher frequency side. FIG. 3B shows a case where the noise components are sufficiently removed at the higher frequency side but is not sufficiently removed at the lower frequency side. FIG. 3C shows a case where the noise components are sufficiently removed at the lower frequency side but is not sufficiently removed at the higher frequency side.

As can be understood from these graphs, all of the obtained frequencies f2 to f4 are positioned adjacent to each other in the case of FIG. 3A. There is no significant difference between respective frequencies f2 to f4.

However, in the case of FIG. 3B, there is a significant difference between the frequencies f2 and f3 due to the influence of noise components residing in the lower frequency region, because the damping property of the lower frequency side is changed in the calculation of these frequencies f2 and f3. More specifically, the frequency f2 is calculated based on the first resonance frequency band. The frequency f3 is calculated based on the second resonance frequency band which is narrowed at the lower frequency side compared with the first resonance frequency band. In other words, the frequency f3 has less influence of noise components residing in the lower frequency region. On the other hand, there is no significant difference between the frequencies f3 and f4 which have the same damping property at the lower frequency side, because the influence of noise is small in the higher frequency region.

Furthermore, in the case of FIG. 3C, there is a significant difference between the frequencies f3 and f4 due to the influence of noise components residing in the higher frequency region, because the damping property of the higher frequency side is changed in the calculation of these frequencies f3 and f4. More specifically, the frequency f3 is calculated based on the second resonance frequency band. The frequency f4 is calculated based on the third resonance frequency band which is narrowed at the higher frequency side compared with the second resonance frequency band. In other words, the frequency f4 has less influence of noise components residing in the higher frequency region. On the other hand, there is no significant difference between the frequencies f2 and f3 which have the same damping property at the higher frequency side, because the influence of noise is small in the lower frequency region.

Accordingly, a difference between the frequency f2 and the frequency f3 is obtained as df1 (=f2−f3). Similarly, a difference between the frequency f3 and the frequency f4 is obtained as df2 (=f3−f4). Then, it is checked whether or not each of the obtained differences df1 and df2 is within a predetermined value. When these differences df1 and df2 are within predetermined values, the frequency f4 residing at a center of dispersion is selected as correct frequency. This selection is executed in the microcomputer. In this respect, the microcomputer serves as determining means of the present invention.

Then, after finishing the above-described selection of the frequency, the control flow proceeds to step S112 wherein the resonance point detecting section 2a performs the smoothing processing for the selected frequency f4. The smoothed resonance frequency is used in the pneumatic tire pressure judgement. Then, the judging section 2b shown in FIG. 1 compares the thus obtained resonance frequency with a predetermined threshold to judge whether or not the pneumatic tire pressure is reduced. Accordingly, this embodiment makes it possible to obtain the optimum resonance frequency having less influence of noise components for the pneumatic tire pressure estimation. Thus, compared with the prior art, this embodiment can perform the pneumatic tire pressure estimation with smaller dispersion.

As described above, the first embodiment of the present invention sets a plurality of resonance frequency bands to obtain the frequencies f2 to f4 to estimate the degree of influence of noise components and selects the optimum resonance frequency having less influence of noise components for the pneumatic tire pressure estimation. Thus, it becomes possible to perform the pneumatic tire pressure estimation with smaller dispersion compared with the prior art.

Second Embodiment

According to the first embodiment, the optimum resonance frequency having less influence of noise components is selected from a plurality of frequencies f2 to f4. On the other hand, the second embodiment estimates the degree of influence of noise components based on a plurality of frequencies and then corrects the obtained frequencies to obtain the resonance frequency used in the pneumatic tire pressure estimation.

Figure 4:
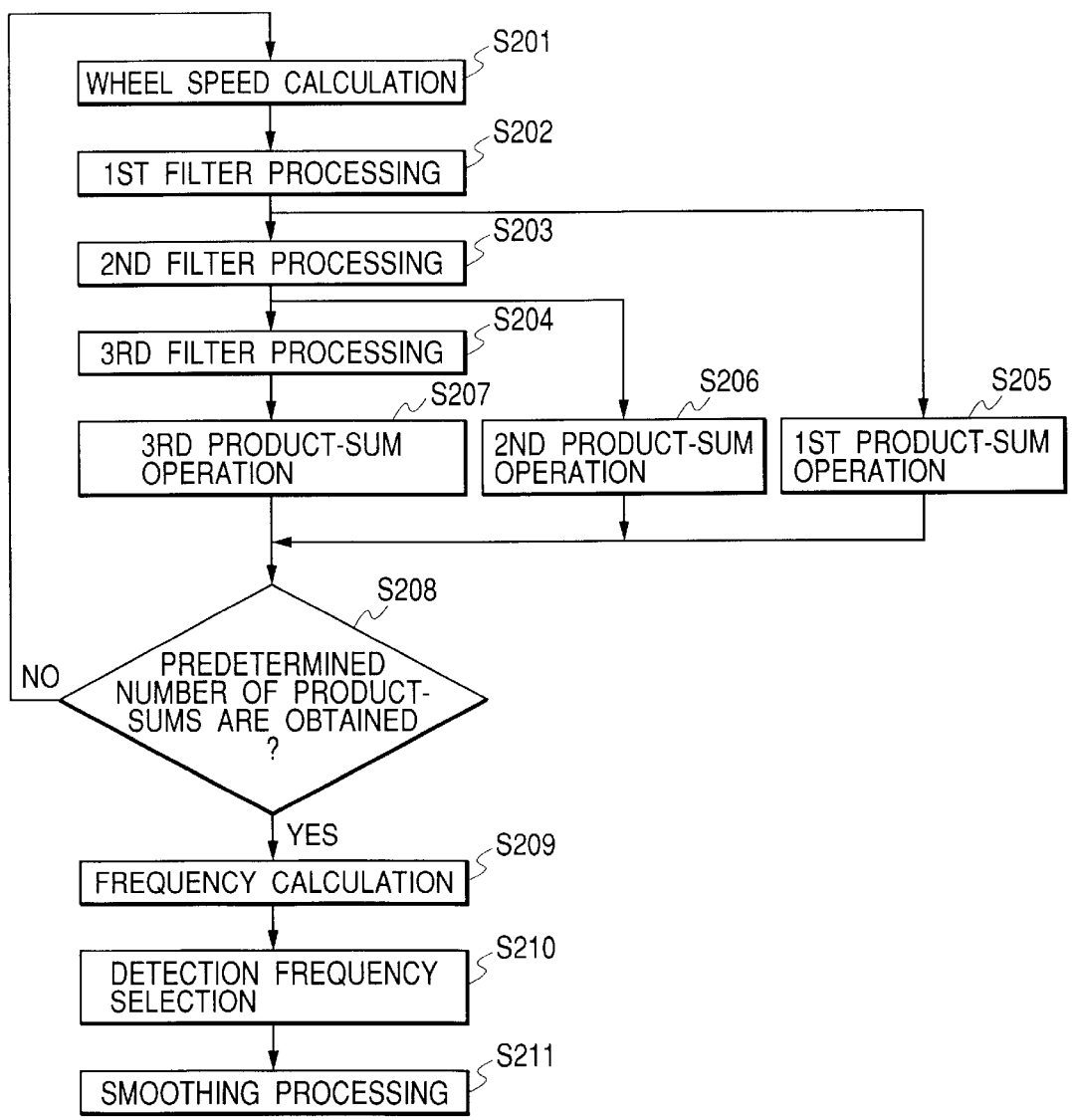
FIG. 4 is a flowchart showing the processing performed in the resonance point detecting section of the pneumatic tire pressure estimating apparatus in accordance with a second embodiment of the present invention.

The pneumatic tire pressure estimating apparatus of the second embodiment has the same arrangement as that of the first embodiment. Hereinafter, the processing performed in the resonance point detecting section 2a of the pneumatic tire pressure estimating apparatus will be explained. FIG. 4 is a flowchart showing the processing performed in the resonance point detecting section 2a in accordance with the second embodiment of the present invention. Details of the pneumatic tire pressure estimation will be explained hereinafter with reference to the flowchart shown in FIG. 4.

The resonance point detecting section 2a performs the following processing in response to entry of the wheel speed signal sent from the wheel speed sensor 1. First, in step S201, the resonance point detecting section 2a calculates a wheel speed based on the wheel speed signal in the same manner as in step S101 of the first embodiment.

Subsequently, the filter processing is successively performed based on the calculated wheel speed in each of steps S202, S203, and S204. First, in step S202, first filter processing is applied to the wheel speed $f_{in}$. More specifically, the resonance point detecting section 2a executes calculation defined by the equation 1. Through this calculation processing, an output $f_{out}$ of a highpass filter having a cutoff frequency of 20 Hz is obtained. This output is referred to as $f_{out1}$. This processing is identical with the processing of step S103 in the first embodiment.

Next, in step S203, the calculation result $f_{out1}$ obtained in step S202 is regarded as $f_{in}$ of the above-described equation 1. Then, the thus obtained $f_{in}$ is subjected to second filter processing using the above-described equation 1, although respective constants $a_{11}$, $a_{21}$, $b_{01}$, $b_{11}$, and $b_{21}$ are different from those used in the step S202. Through this calculation processing, an output $f_{out}$ of a highpass filter having a cutoff frequency of 25 Hz is obtained. This output is referred to as $f_{out2}$.

Next, in step S204, the calculation result $f_{out2}$ obtained in step S203 is regarded as $f_{in}$ of the above-described equation 1. Then, the thus obtained $f_{in}$ is subjected to third filter processing using the above-described equation 1, although respective constants $a_{11}$, $a_{21}$, $b_{01}$, $b_{11}$, and $b_{21}$ are different from those used in steps S202 and S203. Through this calculation processing, an output $f_{out}$ of a lowpass filter having a cutoff frequency of 60 Hz is obtained. This output is referred to as $f_{out3}$.

On the other hand, in steps S205 to S209, the resonance point detecting section 2a derives the frequencies f1 to f3 based on the outputs $f_{out1}$ to $f_{out3}$. The method for deriving these frequencies f1 to f3 is the same as that of the first embodiment.

Subsequently, in step S210, the resonance point detecting section 2a corrects the detected frequency based on the thus obtained frequencies f1 to f3 to obtain an optimum resonance frequency having less influence of peripheral noise for the pneumatic tire pressure estimation. The method for correcting the frequencies will be explained with reference to FIGS. 5 and 6.

Figure 5:
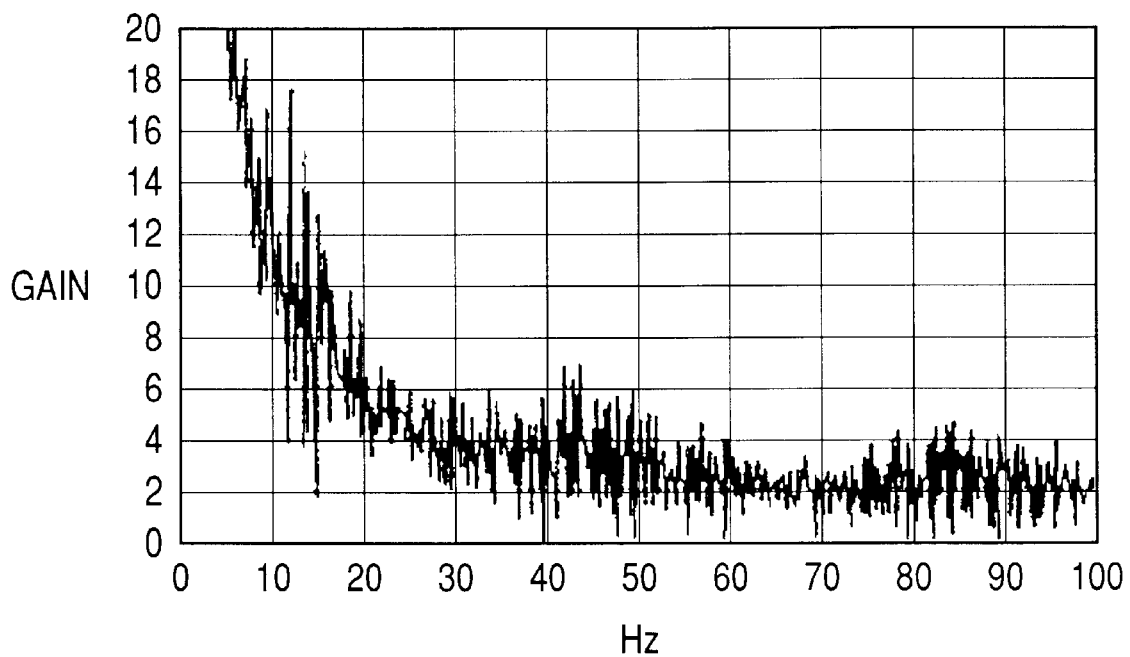
FIG. 5 is a graph showing an example of the vibration distribution of an input signal.
Figure 6A:
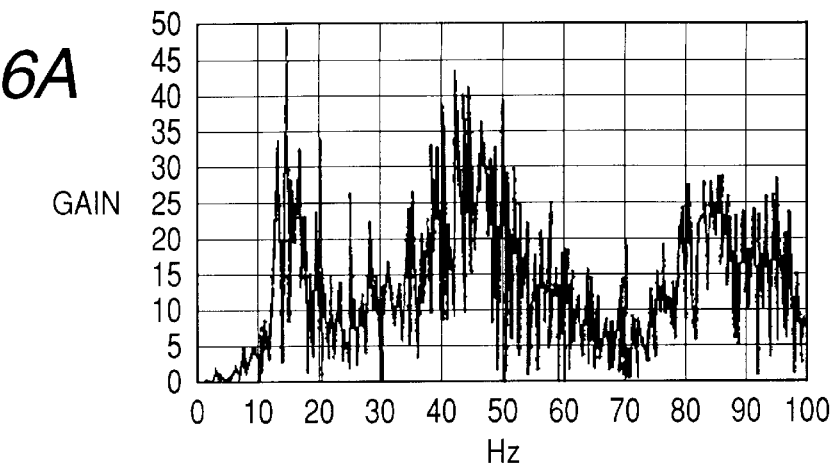
FIGS. 6A, 6B and 6C are graphs showing respective frequencies f1~f3 obtained in the case an input signal has the vibration distribution shown in FIG. 5.
Figure 6B:
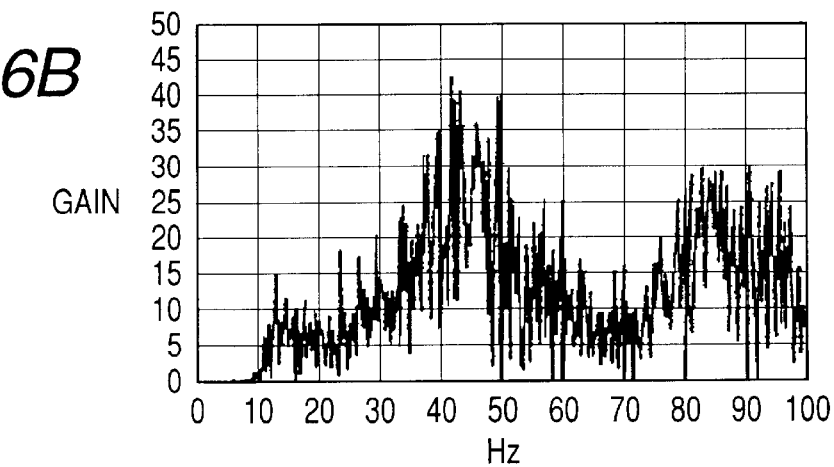
Figure 6C:
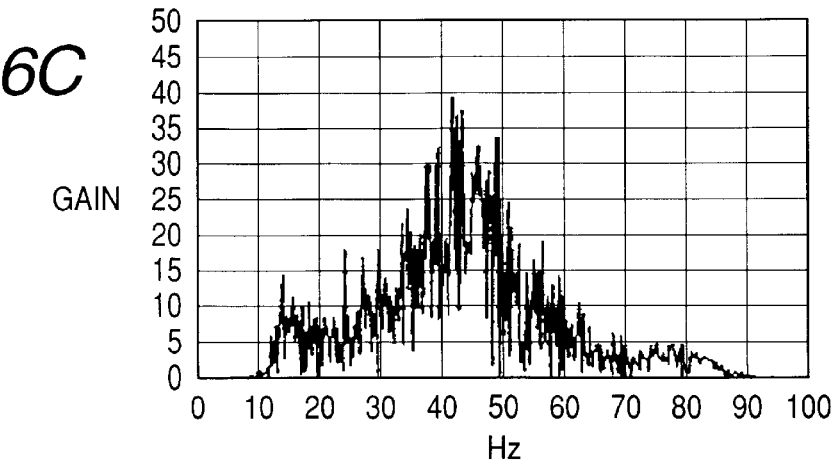

FIG. 5 shows an example of vibration distribution of an input signal. FIGS. 6A, 6B and 6C are graphs showing respective frequencies f1~f3 obtained in the case an input signal has the vibration distribution shown in FIG. 5.

In an ordinary case, the frequency f3 will be adopted as the frequency f3 is obtained from the output $f_{out3}$ of the filter having a desired band width of 25 to 60 Hz. When the order of filter is low, the position of centroid tends to cause a deviation due to influence of noise components less than 25 Hz or larger than 60 Hz. The output $f_{out1}$ and the $f_{out2}$ possibly deviate toward the lower frequency side or the higher frequency side. The same thing is applied to the frequencies f1 and f2 derived from the outputs $f_{out1}$ and the $f_{out2}$. The degree of influence of peripheral noise is difference between the frequencies f1 and f2 due to the difference of passband. More specifically, when compared with the frequency f1, the frequency f2 is less influenced by the noise components in the lower frequency region. Accordingly, the relationship f1<f2 is established. On the other hand, when compared with the frequency f2, the frequency f3 is less influenced by the noise components in the higher frequency region. Accordingly, the relationship f2>f3 is established.

The difference between the frequency f1 and the frequency f2 is proportional to the influence of the lower frequency region. In other words, the difference between the frequency f1 and the frequency f2 becomes large with increasing influence of the lower frequency region. The frequency f2 itself is drawn toward the lower frequency side from an actual frequency position. The same thing is applied to the difference between the frequency f2 and the frequency f3. There is a significant influence of the higher frequency region.

Accordingly, the frequency f3 can be corrected to a true frequency based on the difference between the frequency f1 and the frequency f2 as well as based on the difference between the frequency f2 and the frequency f3.

However, the difference between the frequency f1 and the frequency f2 contains the influence of the noise components in the higher frequency region which has not attenuated at all from each of the frequencies f1 and f2. Thus, in practice, the following method is used to obtain a differential component and determine the true frequency by correcting the influence of noise components.

Figure 7A:
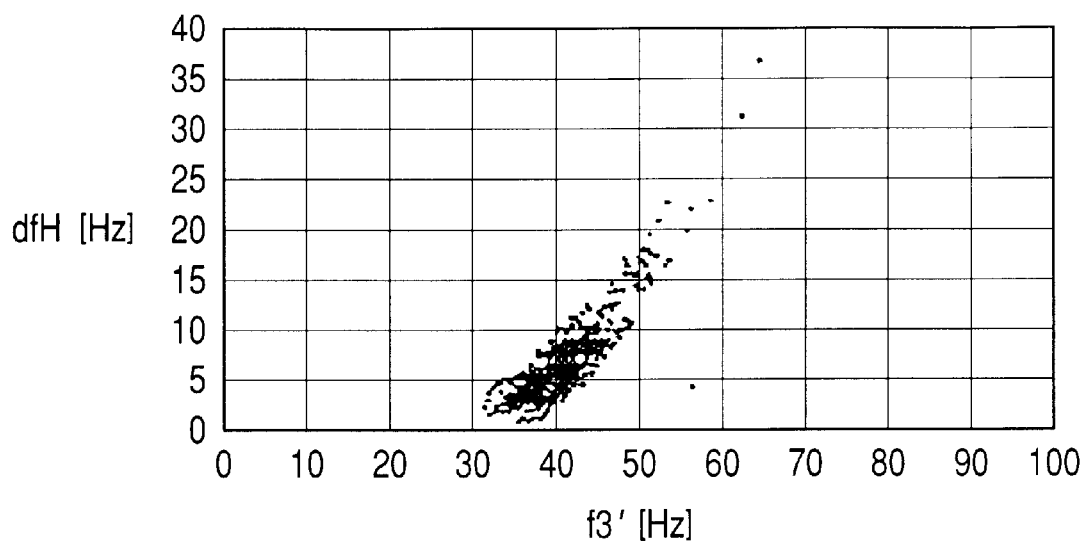
FIG. 7A is a graph showing the relationship between actual frequency f3 and difference dfH.

First, when dfH represents the difference between the frequency f2 and the frequency f3, the following equation is introduced to correct the frequency f3 based on the difference dfH. In the following equation, KH represents a correction coefficient obtained through characteristics measurement using the data showing the relationship between actual frequency f3 and difference dfH as shown in FIG. 7A.

$$f3'=f3-KH \times dfH \tag{11}$$

Figure 7B:
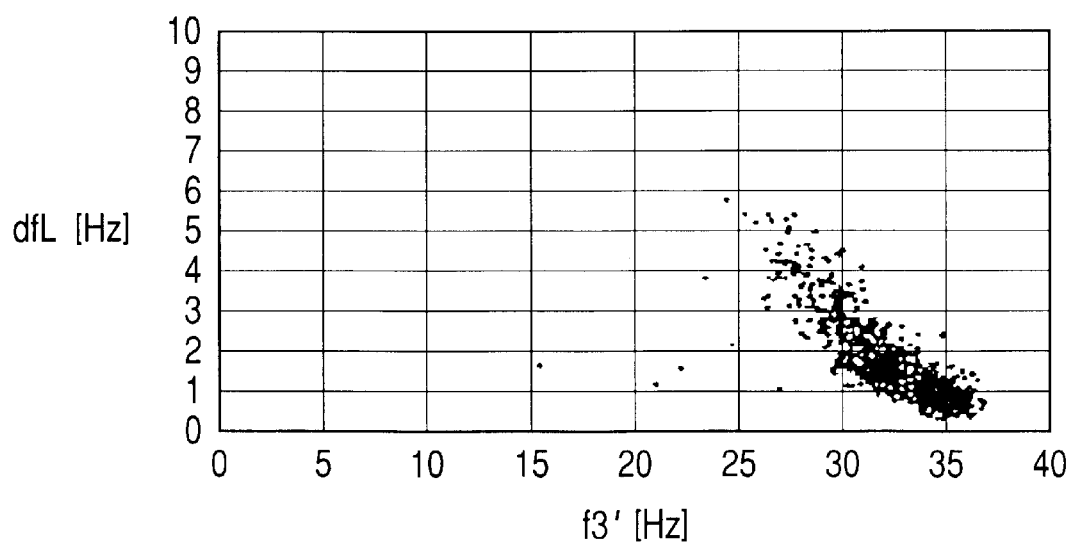
FIG. 7B is a graph showing the relationship between actual frequency f3' and difference dfL.

Next, when dfL represents the difference between the frequency f1 and the frequency f3', the following equation is introduced to correct the frequency f3' based on the difference dfL. In the following equation, KL represents a correction coefficient obtained through characteristics measurement using the data showing the relationship between actual frequency f3' and difference dfL as shown in FIG. 7B.

$$f3''=f3'+KL \times dfL \tag{12}$$

The thus obtained frequency f3" is recognized as the true frequency obtained through the correction. Subsequently, in step S211, the resonance point detecting section 2a performs the smoothing processing for the corrected frequency f3". The thus smoothed corrected frequency f3" is used in the pneumatic tire pressure judgement. Then, the judging section 2b shown in FIG. 1 compares the thus obtained resonance frequency with a predetermined threshold to judge whether or not the pneumatic tire pressure is reduced. Accordingly, this embodiment makes it possible to obtain the optimum resonance frequency having less influence of noise components for the pneumatic tire pressure estimation. Thus, compared with the prior art, this embodiment can perform the pneumatic tire pressure estimation with smaller dispersion.

As described above, the second embodiment of the present invention sets a plurality of resonance frequency bands to obtain the resonance frequencies f1 to f3 to estimate the degree of influence of noise components and corrects the frequency f3. The corrected frequency f3' is used to obtain the optimum resonance frequency for the pneumatic tire pressure estimation. Thus, it becomes possible to perform the pneumatic tire pressure estimation with smaller dispersion compared with the prior art.

Third Embodiment

The third embodiment is characterized in that vibration gains passing through a plurality of filters having different passbands are used to correct a frequency obtained from an output passing through a central filter, thereby obtaining an optimum resonance frequency for the pneumatic tire pressure estimation.

Figure 8:
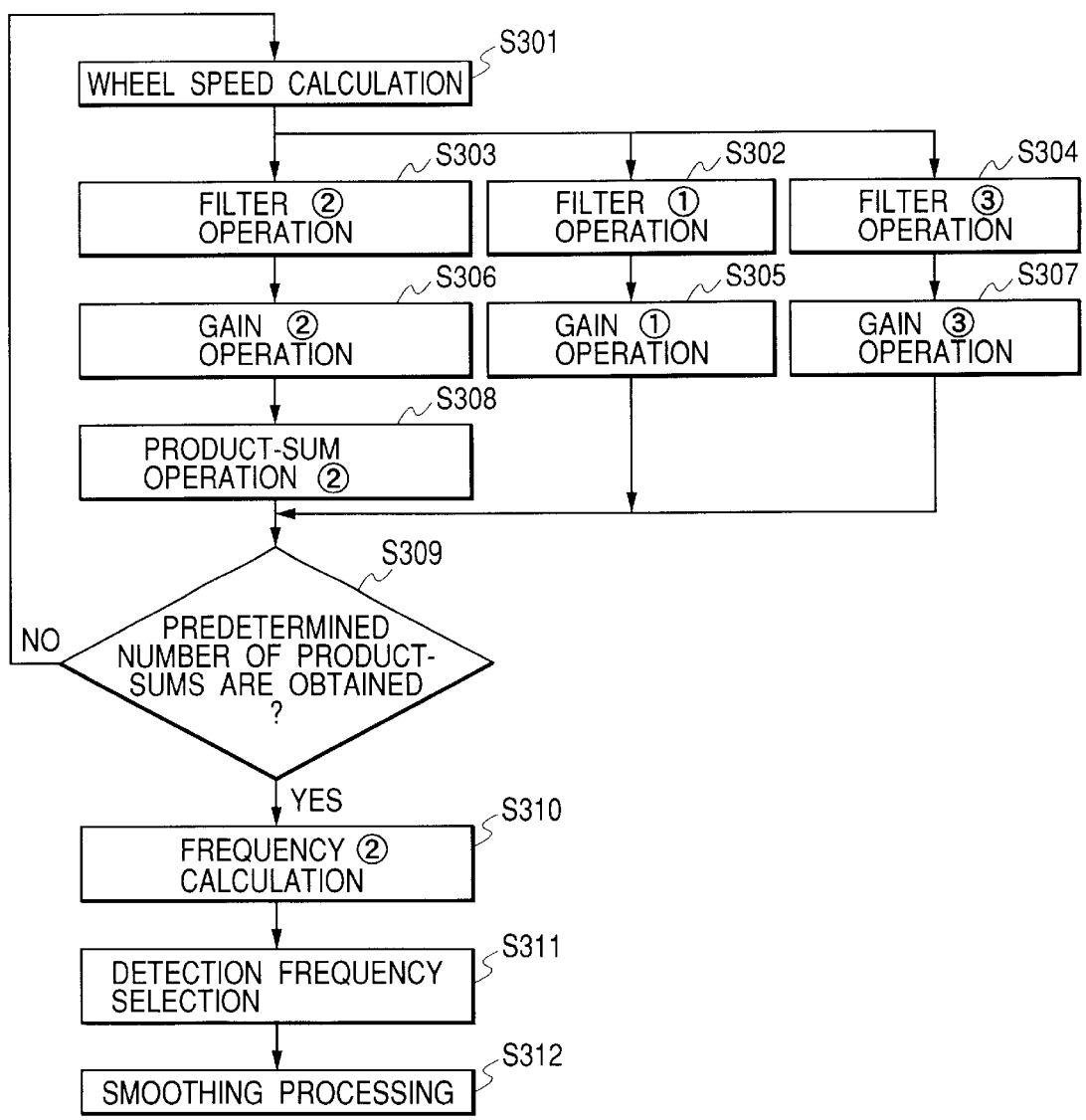
FIG. 8 is a flowchart showing the processing performed in the resonance point detecting section of the pneumatic tire pressure estimating apparatus in accordance with a third embodiment of the present invention.

The pneumatic tire pressure estimating apparatus of the third embodiment has the same arrangement as that of the first embodiment. Hereinafter, the processing performed in the resonance point detecting section 2a of the pneumatic tire pressure estimating apparatus will be explained. FIG. 8 is a flowchart showing the processing performed in the resonance point detecting section 2a in accordance with the third embodiment of the present invention. Details of the pneumatic tire pressure estimation will be explained hereinafter with reference to the flowchart shown in FIG. 8.

The resonance point detecting section 2a performs the following processing in response to entry of the wheel speed signal sent from the wheel speed sensor 1. First, in step S301, the resonance point detecting section 2a calculates a wheel speed based on the wheel speed signal in the same manner as in step S101 of the first embodiment.

Subsequently, the filter processing is successively performed based on the calculated wheel speed in each of steps S302, S303, and S304. First, in step S302, first filter processing is applied to the wheel speed $f_{in}$. More specifically, the resonance point detecting section 2a executes calculation defined by the above-described equation 1. Through this calculation processing, an output $f_{out}$ of a bandpass filter having a passband of 10 to 20 Hz is obtained. This output is referred to as $f_{out1}$. This processing is identical with the processing of step S103 in the first embodiment.

Next, in step S303, second filter processing is applied to the wheel speed $f_{in}$ although respective constants $a_{11}$, $a_{21}$, $b_{01}$, $b_{11}$, and $b_{21}$ are different from those used in the step S302. Through this calculation processing, an output $f_{out}$ of a bandpass filter having a passband of 25 to 60 Hz is obtained. This output is referred to as $f_{out2}$.

Next, in step S304, third filter processing is applied to the wheel speed $f_{in}$ although respective constants $a_{11}$, $a_{21}$, $b_{01}$, $b_{11}$, and $b_{21}$ are different from those used in the steps S302 and S303. Through this calculation processing, an output $f_{out}$ of a bandpass filter having a passband of 65 to 100 Hz is obtained. This output is referred to as $f_{out3}$.

On the other hand, in steps S305 to S307, the resonance point detecting section 2a obtains vibration gains G1 to G3 by accumulating square-sums of respective outputs $f_{out1}$ to $f_{out3}$. Then, in step S308, the resonance point detecting section 2a calculates a product-sum of output $f_{out2}$.

Then, in step S309, it is checked whether or not a predetermined number of product-sums are obtained. Then, in step S310, the resonance point detecting section 2a obtains the frequency f2 corresponding to the resonance frequency based on the product-sum obtained in step S308. The method for obtaining the frequency f2 is the same as that of step S110 in the first embodiment.

Subsequently, in step S311, the resonance point detecting section 2a corrects the frequency f2 based on the thus obtained frequency f2 and gains G1 to G3 to obtain a correct frequency having less influence of peripheral noise for the pneumatic tire pressure estimation. The method for estimating the correct resonance frequency will be explained with reference to FIGS. 9 and 10.

Figure 9:
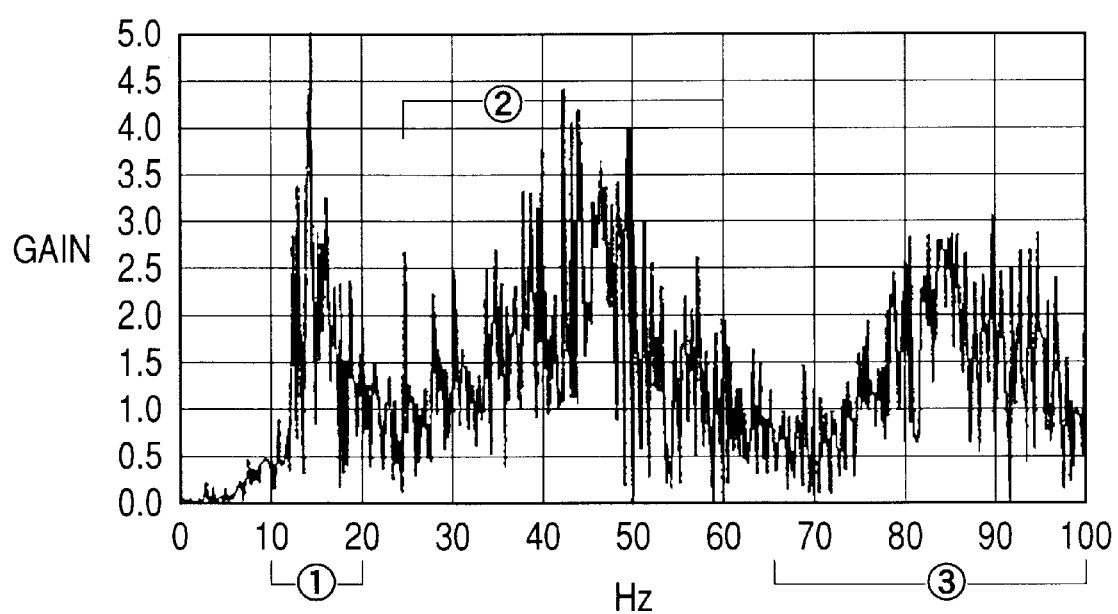
FIG. 9 is a graph showing an example of the vibration distribution of an input signal.

FIG. 9 shows an example of the vibration distribution of an input signal. When an input signal has the vibration distribution shown in FIG. 9, the vibration gains G1 to G3 passing through respective filters are detected as having the magnitudes proportional to respective vibrational frequency components. In FIG. 9, regions ①  to ③  indicate the passbands of the bandpass filters used in the first to third filter processing.

Figure 10A:
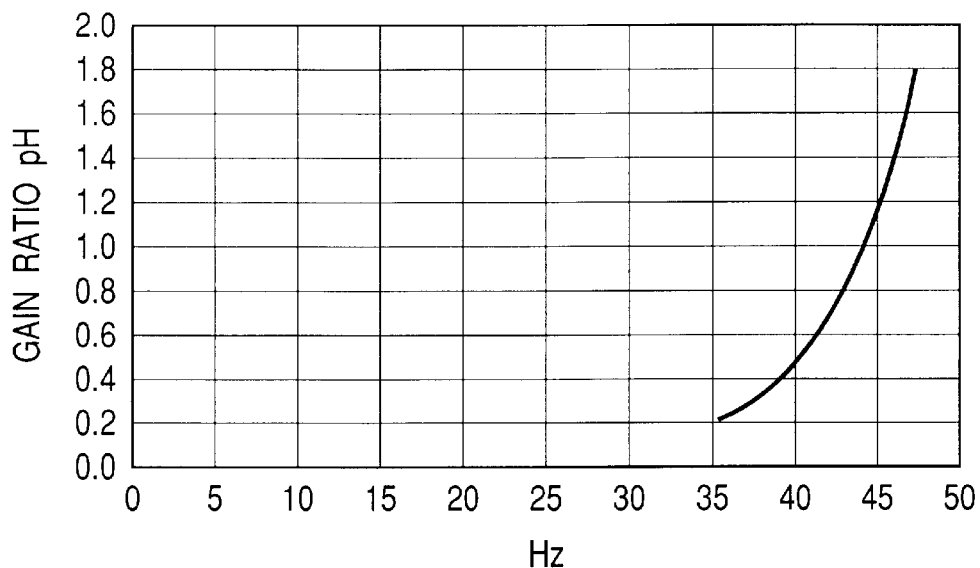
FIGS. 10A and 10B show gain ratios (G3/G2 and G1/G2) relative to the detected frequency f2, wherein the gain ratio is a ratio of the vibration gain G1 obtained through the first filter processing or the vibration gain G3 obtained through the third filter processing with respect to the vibration gain G2 obtained through the second filter processing when the vibration gain G2 serving as signal component is regarded as 100%.
Figure 10B:
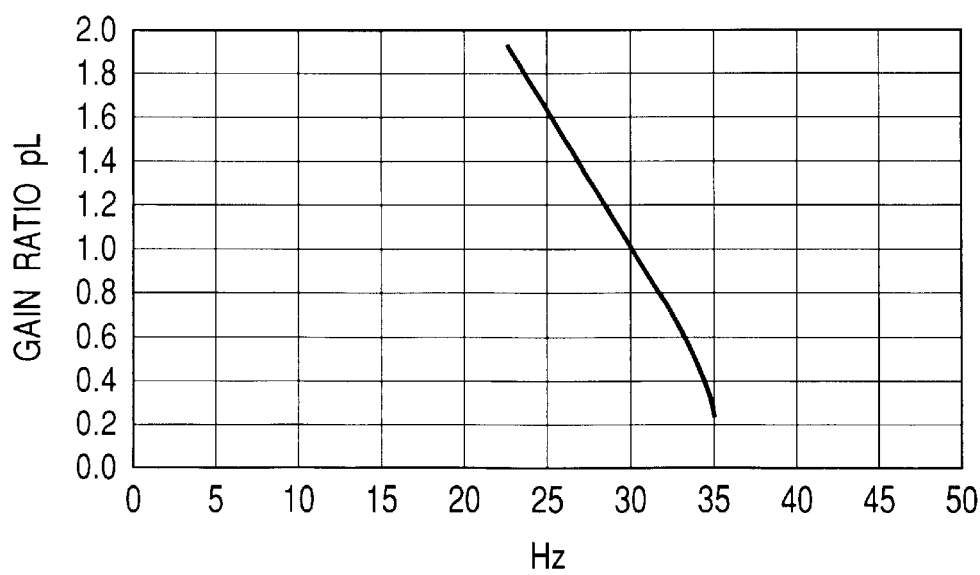

FIGS. 10A and 10B show gain ratios (G3/G2 and G1/G2) relative to the detected frequency f2. The gain ratio is a ratio of the vibration gain G1 obtained through the first filter processing or the vibration gain G3 obtained through the third filter processing with respect to the vibration gain G2 obtained through the second filter processing when the vibration gain G2 serving as signal component is regarded as 100%. As understood from the graphs shown in FIGS. 10A and 10B, a proportional relationship is recognized between the gain ratio (G3/G2, G1/G2) and the detected frequency f2. This proportional relationship can be utilized to correct the frequency f2 based on the gain ratio. Accordingly, it becomes possible to obtain the correct frequency having less influence of noise components.

More specifically, when pH represents the ratio (G3/G2) of gain G3 to gain G2, the following equation is introduced to correct the frequency f2 based on the ratio pH. In the following equation, KH represents a correction coefficient obtained through characteristics measurement using the data showing the relationship between actual frequency f2 and ratio pH as shown in FIG. 10A.

$$f2'=f2-KH \times pH \tag{13}$$

Next, when pL represents the ratio (G1/G2) of gain G1 to gain G2, the following equation is introduced to correct the frequency f2' based on the ratio pL. In the following equation, KL represents a correction coefficient obtained through characteristics measurement using the data showing the relationship between actual frequency f2' and ratio pL as shown in FIG. 10B.

$$f2''=f2'+KL \times pL \tag{14}$$

The thus obtained frequency f2" is recognized as the true frequency obtained through the correction. Subsequently, in step S312, the resonance point detecting section 2a performs the smoothing processing for the corrected frequency f2".

The thus smoothed corrected frequency f2″ is used in the pneumatic tire pressure judgement. Then, the judging section 2b shown in FIG. 1 compares the thus obtained resonance frequency with a predetermined threshold to judge whether or not the pneumatic tire pressure is reduced. Accordingly, this embodiment makes it possible to obtain the optimum resonance frequency having less influence of noise components for the pneumatic tire pressure estimation. Thus, compared with the prior art, this embodiment can perform the pneumatic tire pressure estimation with smaller dispersion.

As described above, the third embodiment of the present invention uses the vibration gains passing through a plurality of filters to correct a resonance frequency obtained from an output passing through a central filter, thereby obtaining a corrected resonance frequency f2″ for the pneumatic tire pressure estimation. Thus, it becomes possible to perform the pneumatic tire pressure estimation with smaller dispersion compared with the prior art.

The first embodiment of the present invention sets a plurality of resonance frequency bands to obtain the resonance frequencies f2 to f4 to estimate the degree of influence of noise components and selects the optimum resonance frequency having less influence of noise components for the pneumatic tire pressure estimation. However, it is possible to obtain an average of the plurality of resonance frequencies f2 to f4.

Furthermore, the second and third embodiments do not set a region for the correction. However, it is possible to perform the above-described correction only when respective dispersion widths of obtained frequencies f1 to f3 are within a predetermined range and only when respective vibration gains G1 to G3 are within a predetermined range.

Furthermore, the above-described first embodiment uses four filters and the above-described second and third embodiments use three filters. However, it is also preferable to use more filters in each embodiment.

Furthermore, the first and second embodiments use lowpass and highpass filters to realize the filter processing in different bandwidths. However, the degree of influence of noise components varies when the damping property of a used filter is changed. Accordingly, in each of the above-described embodiments, it is possible to use filters having different damping properties to obtain a correct resonance frequency. Furthermore, the first and second embodiments use lowpass and highpass filters to set the first to third resonance frequency bands. However, it is also preferable to use bandpass filters to set first to third resonance frequency bands.

What is claimed is:

1. An apparatus for estimating a pneumatic tire pressure comprising:

tire vibrational information detecting means for detecting vibrational information of a tire;

filtering means for filtering desired frequency information based on the vibrational information detected by said tire vibrational information detecting means;

resonance frequency detecting means for detecting a resonance frequency based on the frequency information filtered by said filtering means; and pneumatic tire pressure estimating means for estimating a pneumatic tire pressure based on said resonance frequency, wherein said filtering means is constituted by a plurality of filters having filtering effects different from each other, and said resonance frequency detecting means comprises means for obtaining frequencies corresponding to the resonance frequency based on respective frequency information passing through said plurality of filters, and determining means for determining an optimum frequency having less influence of noise based on the obtained frequencies, thereby obtaining said resonance frequency based on the optimum frequency determined by said determining means.

2. The apparatus for estimating a pneumatic tire pressure in accordance with claim 1, wherein when a dispersion width of said obtained frequencies is within a predetermined value, said determining means identifies a central value among said obtained frequencies as said optimum frequency having less influence of noise.

3. The apparatus for estimating a pneumatic tire pressure in accordance with claim 1, wherein when a dispersion width of said obtained frequencies is within a predetermined value, said determining means identifies an average value of said obtained frequencies as said optimum frequency having less influence of noise.

4. The apparatus for estimating a pneumatic tire pressure in accordance with claim 1, wherein said determining means corrects said obtained frequencies and identifies a corrected value as said optimum frequency having less influence of noise.

5. The apparatus for estimating a pneumatic tire pressure in accordance with claim 4, wherein said determining means performs said correction based on a deviation of said obtained frequencies.

6. The apparatus for estimating a pneumatic tire pressure in accordance with claim 4, wherein said determining means performs said correction only when the dispersion width of said obtained frequencies is within a predetermined value.

7. The apparatus for estimating a pneumatic tire pressure in accordance with claim 1, wherein said plurality of filters have different bandwidths or damping properties.

8. The apparatus for estimating a pneumatic tire pressure in accordance with claim 1, wherein said plurality of filters have different passbands.

9. The apparatus for estimating a pneumatic tire pressure in accordance with claim 1, wherein said plurality of filters comprise a first filter passing a first resonance frequency band including a desired frequency component, a second filter passing a second resonance frequency band narrower than said first resonance frequency band, and a third filter passing a third resonance frequency band narrower than said second resonance frequency band.

10. An apparatus for estimating a pneumatic tire pressure comprising:

tire vibrational information detecting means for detecting vibrational information of a filtering means for filtering desired frequency information based on the vibrational information detected by said tire vibrational information detecting means;

resonance frequency detecting means for detecting a resonance frequency based on the frequency information filtered by said filtering means; and pneumatic tire pressure estimating means for estimating a pneumatic tire pressure based on said resonance frequency, wherein:

said filtering means is constituted by a plurality of filters having filtering effects different from each other;

said resonance frequency detecting means comprises means for obtaining frequencies corresponding to the resonance frequency based on respective frequency information passing through said plurality of filters, and determining means for determining an optimum frequency having less influence of noise based on the obtained frequencies, thereby obtaining said resonance frequency based on the optimum frequency determined by said determining means; and said plurality of filters comprise a first filter passing a first resonance frequency band including a desired frequency component, a second filter passing a second resonance frequency band narrower than said first resonance frequency band, and a third filter passing a third resonance frequency band narrower than said second resonance frequency band;

said first filter for setting said first resonance frequency band is constituted by a first lowpass filter for filtering a frequency region higher than said first resonance frequency band and a first highpass filter for filtering a frequency region lower than said first resonance frequency band;

said second filter for setting said second resonance frequency band is constituted by said first lowpass filter and a second highpass filter having a cutoff frequency higher than that of said first highpass filter; and said third filter for setting said third resonance frequency band is constituted by said second highpass filter and a second lowpass filter having a cutoff frequency lower than that of said first lowpass filter.

11. The apparatus for estimating a pneumatic tire pressure in accordance with claim 1, wherein said means for obtaining frequencies corresponding to said resonance frequency comprises means for calculating a product-sum of respective frequency information passing through said first to third resonance frequency bands, and obtains said frequencies corresponding to the resonance frequency based on the result of respective product-sum calculations.

12. An apparatus for estimating a pneumatic tire pressure comprising:

tire vibrational information detecting means for detecting vibrational information of a tire;

filtering means for filtering desired frequency information based on the vibrational information detected by said tire vibrational information detecting means;

resonance frequency detecting means for detecting a resonance frequency based on the frequency information filtered by said filtering means; and pneumatic tire pressure estimating means for estimating a pneumatic tire pressure based on said resonance frequency, wherein said filtering means is constituted by a plurality of filters having filtering effects different from each other, and said resonance frequency detecting means comprises means for obtaining gains based on respective frequency information passing through said plurality of filters, and determining means for determining an optimum frequency having less influence of noise based on the obtained gains, thereby obtaining said resonance frequency based on the optimum frequency determined by said determining means.

13. The apparatus for estimating a pneumatic tire pressure in accordance with claim 12, wherein said resonance frequency detecting means comprises means for obtaining frequencies based on respective frequency information passing through said plurality of filters, and said determining means corrects the obtained frequencies based on said gains to determine the optimum frequency having less influence of noise.

14. The apparatus for estimating a pneumatic tire pressure in accordance with claim 13, wherein said determining means performs said correction based on a ratio of said gains.

15. The apparatus for estimating a pneumatic tire pressure in accordance with claim 13, wherein said determining means performs said correction only when a ratio of said gains is within a predetermined range.

16. The apparatus for estimating a pneumatic tire pressure in accordance with claim 12, wherein said plurality of filters have different passbands.

17. An apparatus for estimating a pneumatic tire pressure comprising:

tire vibrational information detecting means for detecting vibrational information of a tire;

filtering means for filtering desired frequency information based on the vibrational information detected by said tire vibrational information detecting means;

resonance frequency detecting means for detecting a resonance frequency based on the frequency information filtered by said filtering means; and pneumatic tire pressure estimating means for estimating a pneumatic tire pressure based on said resonance frequency, wherein:

said filtering means is constituted by a plurality of filters having filtering effects different from each other;

said resonance frequency detecting means comprises means for obtaining frequencies corresponding to the resonance frequency based on respective frequency information passing through said plurality of filters, and determining means for determining an optimum frequency having less influence of noise based on the obtained frequencies, thereby obtaining said resonance frequency based on the optimum frequency determined by said determining means; and said optimum frequency is determined considering a relative balance between a resonance frequency energy or gain and a peripheral noise energy or frequency; and said plurality of filters have a filter region including a peripheral band and a resonance frequency band.

18. An apparatus for estimating a pneumatic tire pressure comprising:

tire vibrational information detecting means for detecting vibrational information of a tire;

filtering means for filtering desired frequency information based on the vibrational information detected by said tire vibrational information detecting means;

resonance frequency detecting means for detecting a resonance frequency based on the frequency information filtered by said filtering means; and pneumatic tire pressure estimating means for estimating a pneumatic tire pressure based on said resonance frequency, wherein:

said filtering means is constituted by a plurality of filters having filtering effects different from each other; and said resonance frequency detecting means comprises means for obtaining frequencies corresponding to the resonance frequency based on respective frequency information passing through said plurality of filters, and determining means for determining an optimum frequency having less influence of noise based on the obtained frequencies, thereby obtaining said resonance frequency based on the optimum frequency determined by said determining means;

said optimum frequency is determined considering a relative balance between a resonance frequency energy or gain and a peripheral noise energy or frequency; and said plurality of filters input identical vibrational information.

19. The apparatus for estimating a pneumatic tire pressure in accordance with claim 18, wherein said plurality of filters perform filtering processing simultaneously.

* * * * *